Jan. 26, 1971

C. R. JOHNSON 3,558,148

FRONT WHEEL SUSPENSION SYSTEM FOR A VEHICLE
HIGH CLEARANCE FRAME

Filed March 26, 1969

INVENTOR
CYRIL RODNEY JOHNSON

BY

ATTORNEY

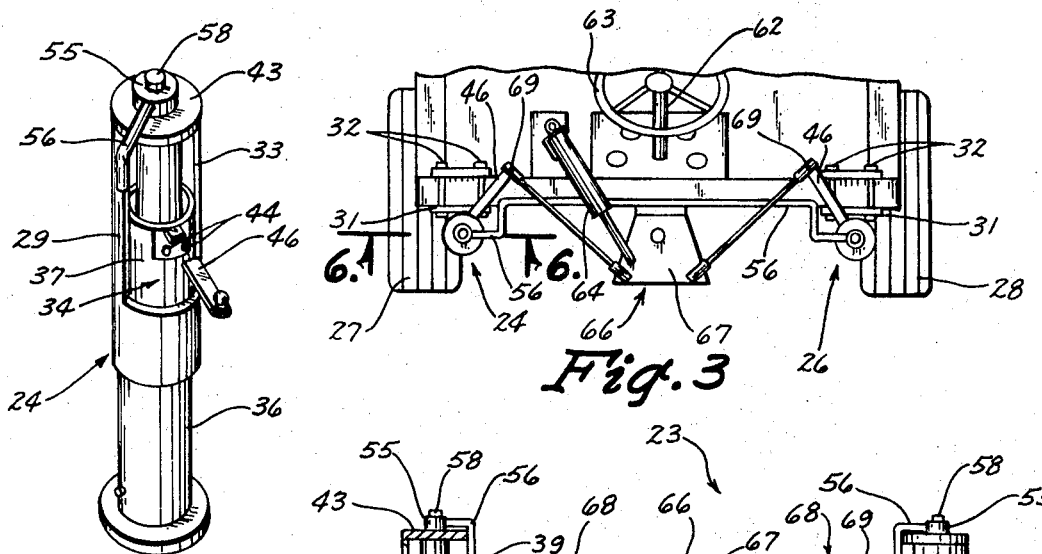
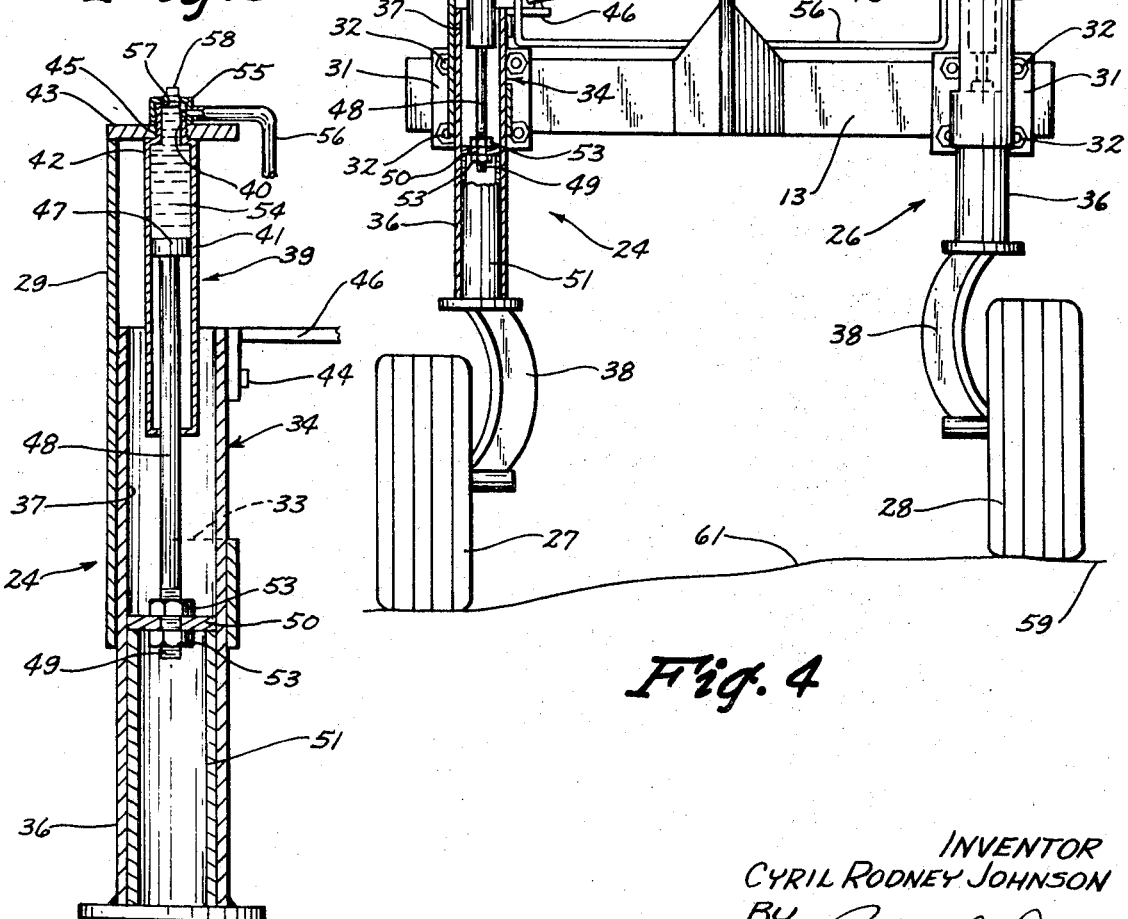

United States Patent Office 3,558,148
Patented Jan. 26, 1971

3,558,148
FRONT WHEEL SUSPENSION SYSTEM FOR A VEHICLE HIGH CLEARANCE FRAME
Cyril Rodney Johnson, Clarion, Iowa, assignor to Hagie Manufacturing Company, Clarion, Iowa, a corporation of Iowa
Filed Mar. 26, 1969, Ser. No. 810,615
Int. Cl. B60g *19/06*
U.S. Cl. 280—6.11                 5 Claims

ABSTRACT OF THE DISCLOSURE

The high clearance frame includes a front transverse member. The suspension system includes a pair of suspension units corresponding to the front steering wheels. Each suspension unit includes an upright cylinder and piston assembly wherein the cylinder is rigidly mounted on the front member and the piston rod is projected outwardly from the lower end of the cylinder for connection with an upright wheel carrying member that is guidably supported on the front member for axial and rotational movement. The fluid chambers formed by the pistons at the upper ends of the cylinders are interconnected by a common fluid line to form a closed fluid reservoir. In response to either front wheel encountering a surface irregularity, one fluid chamber is expanded concurrently with the contraction of the other fluid chamber to maintain the front transverse member in a substantially horizontal position.

SUMMARY OF THE INVENTION

The front wheel suspension system is of a compact and rugged construction and efficient in operation to maintain the front end of the vehicle frame horizontally positioned transversely of the frame for a travel of the front wheels over an irregular ground surface. Thus, crop spraying apparatus or the like carried on such front end and extended laterally from opposite sides of the frame are retained against excessive bouncing movements or jolting actions that would interfere with their proper or precision working of the crops in a field. The suspension units corresponding to the front wheels provide for the support of the front end of the vehicle frame on expansible and retractible fluid chamber means which, in response to elevation variations between the front wheels effect a relatively reversed simultaneous vertical movement of the wheels relative to the front end of the frame. An upright front wheel carrying member is connected with a movable wall of an associated fluid chamber means for rotational movement relative to the fluid chamber means to provide for a steering of the front wheels. As a result the vertical movement of the front wheels during a frame leveling operation of the suspension units and the steering operation of the front wheels may take place conjointly or independently of each other.

BRIEF DESCRIPTION OF THE DRAWINGS

Referring to the drawings:
FIG. 3 is an enlarged top plan view of the front end portion of the assembly in FIG. 1;
FIG. 4 is a front elevation view showing the relative positions of the front wheel suspension units when one front wheel is elevated relative to the other front wheel;

FIG. 5 is a perspective view of a front wheel suspension unit; and
FIG. 6 is an enlarged sectional view of a suspension unit taken along line 6—6 in FIG. 3.

DETAILED DESCRIPTION OF THE PREFERRED EMBODIMENT

Figure 1:
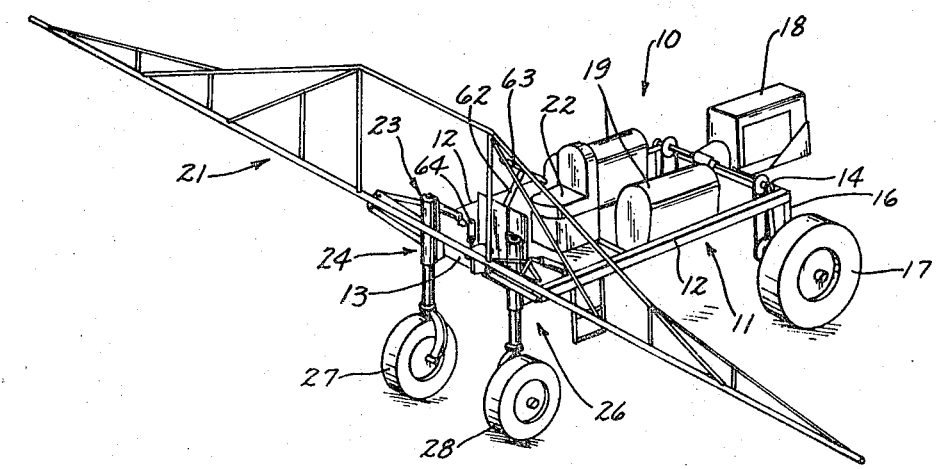
FIG. 1 is a perspective view of an agricultural vehicle having a high clearance frame showing the front wheel suspension system of this invention in assembly relation with such frame.
Figure 2:
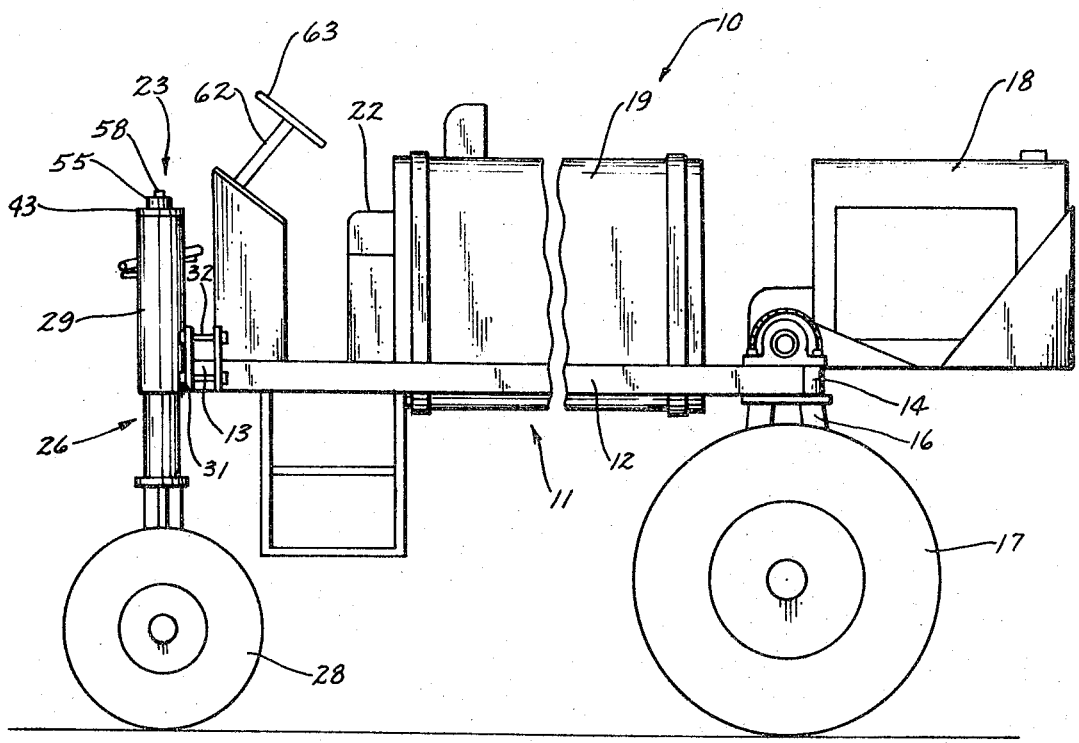
FIG. 2 is an enlarged side elevation view of the assembly in FIG. 1.

Referring to the drawings, there is illustrated in FIG. 1 an agricultural vehicle, indicated generally at 10, having a high clearance frame 11 that includes a pair of side members 12 interconnected by front and rear transverse members 13 and 14, respectively. A rear drive wheel support assembly 16 has wheels 17 driven from an engine 18 that is mounted on and located rearwardly of the frame 11. As shown, the vehicle 10 is adapted for a crop spraying operation and has liquid containing tanks 19 carried on the frame and a transverse spray boom 21 located forwardly of the driver's seat 22 and projected laterally from opposite sides of the frame.

The front wheel suspension system of this invention, designated generally as 23 in FIG. 1 is carried on the front transverse member 13 and includes a pair of upright suspension units 24 and 26 corresponding to the front steering wheels 27 and 28, respectively. Since each suspension unit 24 or 26 is of a like construction and similarly assembled with a front wheel and the vehicle frame 11, only the suspension unit 24 will be described in detail with like numbers being applied to like parts.

The suspension unit 24 includes a cylindrical guide member 29 (FIGS. 4, 5 and 6) that has a mounting plate 31 adjacent its lower end for attachment to the forward side of the front transverse member 13 in a usual manner by bolts 32. As best appears in FIG. 5 the guide member 29 has a wall section removed to form a longitudinally extended opening 33 for a purpose to appear later.

Supported within the guide member 29 for axial and rotational movement relative thereto is an upright wheel carrying member 34 of a cylindrical tubular shape. The member 34 has a lower section 36 projected downwardly from the guide member 29 and an upper section 37 located within the guide member and extended across the opening 33. The bottom end of the lower section 34 is suitably secured, as by weldments, to a yoke member 38 which rotatably carries the front wheel 27 for rotation about a horizontal axis.

Positioned in axial alignment with the upright support or wheel carrying member 34 is a fluid cylinder and piston assembly 39. The upper end 42 of the cylinder 41 of the assembly 39 is formed with an upright centrally located fluid pipe 40 that projects through a central opening 45 in a circular plate member 43 that has a diameter substantially equal to the diameter of the cylindrical guide member 29. The plate member 43 is secured in a covering or closing relation with the upper end of the guide member 29. It is thus seen that the guide member 29 and the plate member 43 constitute a mounting means for rigidly supporting the front transverse member 13 on the cylinder 41.

The lower end of the cylinder 41 projects axially within the top end of the wheel carrying member 34. Extended through the opening 33 in the guide member 29 and secured as by screws 44 to the wheel carrying member 34 is a radially extended arm 46.

The piston 47 for the cylinder 41 (FIG. 6) has a rod 48 that extends outwardly from the lower end of the cylinder 41 for connection of its free end 49 with a top wall 50 for the upper end of a tubular plug member 51 of a cylindrical shape. The plug member 51 is positioned within the lower section 36 of the upright support 34 with its bottom end resting on the yoke member 38. The piston rod 48 is locked to the plug member 51 by locking nuts 53 arranged to opposite sides of the top wall 50.

Referring to FIG. 6, it is seen that the piston 47 and the upper end 42 of the cylinder 41 form an expansible and retractable fluid chamber means 54 with the piston 47 constituting a movable wall for such chamber. It is further seen that the front transverse frame member 13 is supported on the front wheels 27 and 28 through the fluid chamber means 54 and piston rods 48. The fluid chambers 54 of the suspension units 24 and 26 are interconnected by a common fluid line 56. A connector 55 on the fluid line, is attachable to the cylinder pipe 40 and includes a fill opening 57 closeable by a plug 58. Thus, on a filling of the chambers 54 with a fluid such as oil the line 56 is concurrently filled. On replacement of the fill plugs 58 the fluid line 56 and the chambers 54 form a closed fluid reservoir. As a result of this closed reservoir any up or down movement of the piston 47 in one of the suspension units 24 or 26, will automatically effect a simultaneous and reverse movement of the piston 47 in the other suspension unit.

As shown in FIG. 4 the front wheel 28 is shown in an elevated position relative to the front wheel 27 by the encountering of a rise 59 in the road surface 61. Without the suspension system 23 the frame 11 would be tilted or moved upwardly at the wheel 28 by an amount equal to the full vertical height of the rise 59. However, by virtue of the suspension system 23 the piston 47 of the suspension unit 26 is moved upwardly by an amount equal to one half the vertical height of the rise 59 to concurrently provide for a downward movement of the piston 47 of the suspension unit 24 by a like amount.

Thus, assuming the full vertical height of the rise 59 to be three inches, such height is divided equally between the cylinder assemblies 39 by a concurrent relative, reversed movement of the piston rods 48. This results in the elevation of the front transverse member 13 by an amount equal to one and one-half inches while being maintained horizontally disposed during such elevation. The suspension system 23 thus not only maintains the front member 13 horizontally disposed but reduces by one-half the vertical movement of the front member 13 relative to the vertical height of the road irregularity 59 encountered by either one of the front wheels 27 or 28. In one embodiment of the invention the pistons 47 have twelve-inch strokes so as to provide for an over-all twelve-inch variation in the relative vertical disposition of the wheels 27 and 28.

The front wheels 27 and 28 are readily steered at all relatively elevated positions thereof by a steering mechanism that includes a steering column 62 provided with a steering wheel 63 and operatively associated with a hydraulic cylinder 64 for power operating a steering linkage mechanism 66. This mechanism includes a pivoted plate 67 connected to the power cylinder 64 and a pair of link systems 68, corresponding to each of the front wheels 24 and 26, and connectible as indicated at 69 with a corresponding radial arm 46. On steering movement of the wheel 63, the power cylinder 64 is actuated to pivotally move the plate 67 to concurrently steer the front wheels 27 and 28.

I claim:

1. A suspension system for a pair of front steering wheels of an agricultural vehicle having a frame with a front transverse member comprising:
   (a) a pair of suspension units corresponding to said front wheels, each suspension unit including an upright support member,
   (b) means rotatably supporting a front wheel at the lower end of a support member for rotational movement about a horizontal axis,
   (c) means mounting a supporting member on said front transverse member for vertical longitudinal and rotational movement including a vertically retractable and expansible fluid chamber means having a first member rigid with said front transverse member and a second member vertically movable with said support member relative to said first member,
   (d) a fluid line interconnecting said fluid chamber means to provide a closed fluid reservoir whereby to effect an expansion of one of said chamber means simultaneously with the contraction of the other one of said chamber means in response to either front wheel encountering a surface irregularity to maintain said front transverse member in a substantially horizontal position, and
   (e) steering means for said front wheels mounted on said frame and interconnected with said support members for concurrently rotating said support members in the same direction.

2. The suspension system according to claim 1 wherein:
   (a) said first member comprises an upright cylinder in coaxial alignment with said support member having a closed upper end and an open lower end and said second member comprises a piston for said cylinder having a piston rod projected from said lower end, and
   (b) means for supporting the free end of said piston rod on said support member.

3. A suspension system for a pair of front steering wheels of an agricultural vehicle having a frame with a front transverse member comprising:
   (a) a pair of suspension units corresponding to said front wheels, each of said suspension units including an upright tubular guide member secured to said front transverse member,
   (b) a support member guidably supported within said guide member for rotational and longitudinal movement relative thereto,
   (c) a cylinder and piston assembly for each suspension unit positioned within and extended axially of a guide member and support member, each assembly including a cylinder member having a closed upper end to form with said piston an expendable and contractable fluid chamber,
   (d) means securing the upper end of the cylinder member to said guide member,
   (e) a rod for said piston projected from the lower end of said cylinder member and engaged with said support member for longitudinal movement therewith,
   (f) means rotatably mounting a front wheel on the lower end of said support member for rotation about a horizontal axis,
   (g) a fluid line interconnecting said fluid chambers to provide a closed fluid reservoir to effect a simultaneous reversed relative movement of said pistons in response to either front wheel encountering a surface irregularity whereby to maintain said front transverse member in a substantially horizontal position, and
   (h) front wheel steering means interconnected with said support members.

4. The suspension system according to claim 3 wherein:
   (a) said support member has a lower end portion projected downwardly from said guide member, and an upper end portion terminating within said guide member,
   (b) said guide member having an elongated vertically extended opening in a side portion thereof, and
   (c) said steering means includes a connector member extended through said opening for connection with said upper end portion of the support member.

5. A suspension system for a pair of front steering wheels of an agricultural vehicle having a high clearance frame with a front transverse member comprising:
   (a) a pair of upright suspension units corresponding to said front wheels, each suspension unit including inner and outer telescoped tubular members, said inner tubular member projected outwardly from the lower end of said outer member,
   (b) means securing each outer member to said front transverse member,
   (c) means rotatably supporting a front wheel at the lower end of said inner tubular member for rotation about a horizontal axis, (d) a cylinder and piston assembly positioned within each inner tubular member including a cylinder member and a piston having a rod extendable and retractable from the lower end of the cylinder member, (e) means supporting said piston on the inner tubular member, (f) means securing the upper end of said cylinder member to said outer tubular member, with a piston and upper end of an associated cylinder member forming an expandable and retractable chamber means, (g) a common fluid line interconnecting said fluid chamber means to form therewith a closed fluid reservoir to effect a substantially simultaneous reversed movement of said piston rods in response to either front wheel encountering a surface irregularity whereby to maintain the front transverse member horizontally extended, and (h) front wheel steering means interconnected with said inner tubular members,

References Cited

UNITED STATES PATENTS

| | | | |
|---|---|---|---|
| 2,220,916 | 11/1940 | Schiff | 280—96.2X |
| 2,917,318 | 12/1959 | Nallinger | 280—104 |
| 3,019,029 | 1/1962 | Sampietro | 280—124 |
| 3,216,736 | 11/1965 | Thomas | 280—6.1 |
| 3,236,456 | 2/1966 | Ackley et al. | 280—6.1X |
| 2,328,019 | 6/1967 | Wilson | 280—6X |

FOREIGN PATENTS

| | | | |
|---|---|---|---|
| 483,365 | 7/1953 | Italy | 280—6 |

LEO FRIAGLIA, Primary Examiner

L. J. PAPERNER, Assistant Examiner

U.S. Cl. X.R.

280—96.2, 124